United States Patent [19]
Funabashi

[11] Patent Number: 6,073,145
[45] Date of Patent: *Jun. 6, 2000

[54] MULTIPLE IMAGE RETRIEVAL AND SIMULTANEOUS DISPLAY

[75] Inventor: Takeshi Funabashi, Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,472

[22] Filed: Mar. 13, 1996

[30] Foreign Application Priority Data

Mar. 23, 1995 [JP] Japan .................................. 7-063891

[51] Int. Cl.[7] ...................................................... G06T 1/00

[52] U.S. Cl. ........................... 707/526; 382/305; 345/435

[58] Field of Search ............................. 345/435; 395/779, 395/788, 789, 615; 382/305; 707/517, 526, 527

[56] References Cited

U.S. PATENT DOCUMENTS

| | | | |
|---|---|---|---|
| Re. 33,316 | 8/1990 | Katsuta et al. | 345/428 |
| 5,179,639 | 1/1993 | Taaffe | 395/128 |
| 5,218,455 | 6/1993 | Kristy | 358/403 |
| 5,440,401 | 8/1995 | Parulski et al. | 386/124 |
| 5,517,621 | 5/1996 | Fukui et al. | 395/779 |
| 5,553,277 | 9/1996 | Hirano et al. | 395/615 |
| 5,572,726 | 11/1996 | Hasuo | 395/616 |
| 5,586,316 | 12/1996 | Tanaka et al. | 395/604 |
| 5,616,930 | 4/1997 | Janssens et al. | 250/584 |
| 5,734,915 | 3/1998 | Roewer | 395/773 |
| 5,781,175 | 7/1998 | Hara | 345/127 |

*Primary Examiner*—Joseph H. Feild
*Attorney, Agent, or Firm*—Sughruem, Mion, Zinn, Macpeak & Seas, PLLC

[57] ABSTRACT

An apparatus and method for displaying a group of images on a single display with increased speed for subsequent displays of the same group of images. The apparatus inputs a plurality of image signals and creates a composite signal of all of the images in accordance with the desired display format. A composite image signal as well as the individual image signals are stored locally, and when the composite image signal is subsequently called upon for display, a speed up is realized because the images are already stored in the format to be displayed.

10 Claims, 2 Drawing Sheets

MULTIPLE IMAGE RETRIEVAL AND SIMULTANEOUS DISPLAY

BACKGROUND OF THE INVENTION

1. Field of the Invention

This invention relates to an image displaying method and apparatus for reproducing visible images from image signals. This invention particularly relates to a method and apparatus for simultaneously displaying a plurality of images, which are related to one another, in a desired display form.

2. Description of the Prior Art

Techniques for utilizing filing systems have heretofore been carried out. With the techniques, a plurality of image signals representing a plurality of images are stored in a filing system, which is provided with a storage medium, such as an optical disk. When necessary, a desired image signal is read from the filing system, and a visible image is reproduced from the image signal.

In the filing systems, a plurality of image signals representing a plurality of images of a single object, such as a patient, which images are related to one another, are often stored on the storage medium. Examples of the plurality of images, which are related to one another, include a plurality of tomographic images of a single object, such as a human body, which are recorded successively, e.g. computed tomography (CT) images and magnetic resonance imaging (MRI) images, and a plurality of contrasted images, which are obtained by recording the images of different portions of a single object such that, for example, as in a gastric examination, the state of movement of swallowed barium from the esophagus to the stomach can be viewed. When the plurality of images, which are related to one another, are to be viewed, necessary operations have heretofore been carried out by a person, who view the images, such that the images may be reproduced from the corresponding image signals and may be displayed in a desired display form on an image reproducing means, such as a cathode ray tube (CRT) display device. For example, the plurality of images, which are related to one another, are displayed one after another on the CRT display device. Alternatively, the display area of the CRT display device is divided into a plurality of windows, and the images, which are related to one another, are displayed respectively in the windows. As another alternative, all of the images, which are related to one another, are displayed simultaneously as index images. As a further alternative, in cases where the number of the images, which are related to one another, is 12, they are displayed by being arrayed in a display form of 3×4 frames.

In cases where a plurality of images are to be displayed by being arrayed in a certain display form, the operator accesses from his display system to the filing system in order to read a plurality of corresponding image signals from the filing system and temporarily stores the image signals on a storage medium of the display system. When a request for displaying the images is made, the image signals are read in units of a single image signal representing a single image from the storage medium and used for the reproduction of visible images. The reproduced images are arrayed one after another, and the images arrayed in a desired display form are thereby formed and displayed on a display means, such as the CRT display device.

However, in cases where a plurality of images are to be displayed in an arrayed form on the display surface of the CRT display device in the manner described above, it is necessary that the image signals are read one after another in units of a single image signal representing a single image from the storage means and the images are reproduced one after another on the CRT display device. Therefore, considerable time has heretofore been required in order to array and display all of the plurality of images.

It is considered to employ a method, wherein an image signal, which is composed of a plurality of image signals representing a plurality of images arrayed in a desired display form, is formed previously by a filing system, thereafter read from the filing system into a display system located on the operator side, and stored on a storage means. When a request for displaying the images is made, the images having been compiled in the desired display form by the filing system may be displayed. However, with such a method, in cases where the desired display form is to be altered to a different display form and the images are to be displayed in the different display form, the plurality of the image signals must be read from the filing system into the display system, which is located on the operator side, and an image signal representing the images arrayed in the different display form must then be formed from the plurality of the image signals. Thereafter, the images arrayed in the different display form must be reproduced from the image signal and displayed on the display system. Therefore, the operations for altering the display form cannot be kept easy.

SUMMARY OF THE INVENTION

The primary object of the present invention is to provide an image displaying method, wherein a plurality of images in a desired display form are capable of being displayed quickly.

Another object of the present invention is to provide an image displaying method, wherein a display form, in which a plurality of images are to be displayed, is capable of being altered easily.

The specific object of the present invention is to provide an apparatus for carrying out the image displaying method.

The term "image signal output means" as used herein means a filing system, which is provided with a storage medium, such as an optical disk, for storing a plurality of image signals, an image recording and read-out apparatus for recording a plurality of images and feeding out image signals, that represent the images, in units of a single image signal representing a single image and in the order in which the images are recorded, or the like.

Also, the term "desired display form" as used herein means the display form, in which a plurality of images are arrayed and displayed simultaneously. For example, in cases where the number of the images to be displayed simultaneously is 12, they are displayed by being arrayed in a display form of 3×4 frames, or the like.

The image displaying method in accordance with the present invention may be modified such that the plurality of the image signals having been read from the image signal output means may also be stored on the storage means, and in cases where a request for displaying the images, which are represented by the plurality of the image signals, in a different display form is made, the plurality of the image signals may be read from the storage means, a different display image signal may be formed in accordance with the different display form, the different display image signal being composed of the plurality of the image signals and representing the plurality of the images arrayed in the different display form, and visible images may be reproduced from the different display image signal and displayed.

Alternatively, the image displaying method in accordance with the present invention may be modified such that the plurality of the image signals having been read from the image signal output means may also be stored on a storage means, which is other than the storage means, and in cases where a request for displaying the images, which are represented by the plurality of the image signals, in a different display form is made, the plurality of the image signals may be read from the other storage means, a different display image signal may be formed in accordance with the different display form, the different display image signal being composed of the plurality of the image signals and representing the plurality of the images arrayed in the different display form, and visible images may be reproduced from the different display image signal and displayed.

The present invention also provides an apparatus for displaying the image displaying method in accordance with the present invention.

With the image displaying method and apparatus in accordance with the present invention, before the plurality of the image signals, which have been read from the image signal output means in units of a single image signal representing a single image, are stored on the storage means, the display image signal is formed which is composed of the plurality of the image signals and which represents the plurality of the images arrayed in the desired display form. In cases where a request for displaying the images is made, the display image signal is read from the storage means, and the visible images are reproduced from the display image signal and displayed. Therefore, the time required to display the images in the desired display form can be kept markedly shorter than with the conventional image displaying method and apparatus, in which a plurality of image signals are read one after another in units of a single image signal representing a single image from a storage means, and in which the images are reproduced one after another on the CRT display device. For example, in cases where 12 images are displayed in a display form of 3×4 frames, the time required to display the images can be kept as short as 1/12 of the time required in the conventional image displaying method and apparatus, in which a plurality of image signals are read one after another in units of a single image signal representing a single image from the storage means, and in which the images are then reproduced one after another.

Also, with the image displaying method and apparatus in accordance with the present invention, the plurality of the image signals having been read from the image signal output means may also be stored on the storage means or on the other storage means. In cases where the images are to be displayed in a different display form, the plurality of the image signals can be read from the storage means or the other storage means, and the different display image signal can be formed in accordance with the different display form. Therefore, the operation for reading out the plurality of the image signals from the image signal output means need not be carried out again, and the images in the different display form can be reproduced and displayed easily.

DESCRIPTION OF THE PREFERRED EMBODIMENTS

The present invention will hereinbelow be described in further detail with reference to the accompanying drawings.

Figure 1:
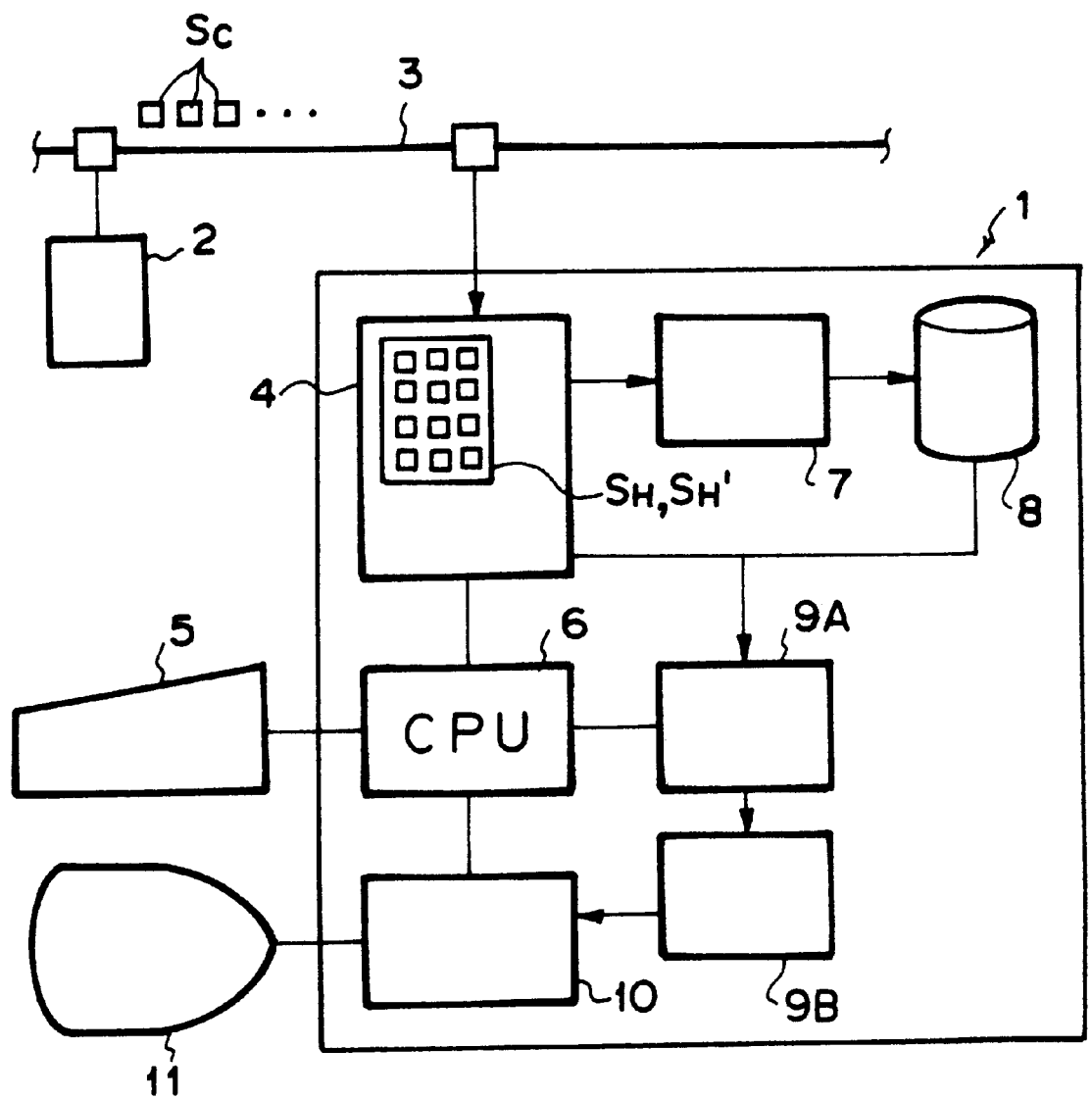
FIG. 1 is a block diagram showing an embodiment of the image displaying apparatus in accordance with the present invention.

FIG. 1 is a block diagram showing an embodiment of the image displaying apparatus in accordance with the present invention. As illustrated in FIG. 1, an image displaying apparatus 1 is connected to an image signal output means 2 by a data bus 3. By way of example, the image signal output means 2 may included a filing system provided with an optical disk for storing a plurality of the image signals $S_C$, each of which represents one of a plurality of CT images of an object having been recorded successively. Alternatively, the image signal output means 2 may be constituted of a CT scanner, which records a plurality of CT images and feeds out the image signals $S_C$ one after another in units of a single image signal representing a single image.

The image displaying apparatus 1 comprises an image storing memory 4, which reads the image signals $S_C$ one after another from the image signal output means 2 and temporarily stores them, and a keyboard 5, from which a display form, or the like, is specified. The image displaying apparatus 1 also comprises a CPU 6, which is connected to the keyboard 5. The CPU 6 operates the image displaying apparatus 1 and has the function of a display image signal forming means for forming a display image signal $S_H$, which is composed of the plurality of the image signals $S_C$ and which represents the plurality of the images arrayed in the display form specified from the keyboard 5. The image displaying apparatus 1 further comprises a compression means 7 for compressing the display image signal $S_H$ and the plurality of the image signals $S_C$, and a magnetic disk 8 for storing the display image signal $S_H$ and the plurality of the image signals $S_C$, which have been compressed by the compression means 7. The image displaying apparatus 1 still further comprises an image size enlarging and reducing means 9A for reading the display image signal $S_H$ from the magnetic disk 8 in accordance with a display request and carrying out image size enlargement or reduction processing on the display image signal $S_H$, and an image processing means 9B for carrying out image processing, such as gradation processing, on the display image signal $S_H$. The image displaying apparatus 1 also comprises an image display frame memory 10 for temporarily storing the display image signal $S_H$, which has been obtained from the image processing carried out by the image processing means 9B, and a CRT display device 11 serving as an image displaying means for reproducing visible images from the display image signal $S_H$ and thereby displaying the visible images in the desired display form.

How the image displaying apparatus 1 in accordance with the present invention operates will be described hereinbelow.

Firstly, a command for reading the plurality of the image signals from the image signal output means 2 is given from the keyboard 5 to the CPU 6. In accordance with the command, the CPU 6 reads the plurality of the image signals $S_C$ one after another in units of a single image signal representing a single image from the image signal output means 2. The image signals $S_C$ pass through the data bus 3 and are stored in units of a single image signal in the image storing memory 4. In this embodiment, 12 image signals $S_{C1}$ through $S_{C12}$, each of which represents one of 12 CT images, are read from the image signal output means 2.

After all of the image signals $S_{C1}$ through $S_{C12}$ have been stored in the image storing memory 4, a desired display form, in which visible images reproduced from the plurality of the image signals $S_{C1}$ through $S_{C12}$ are to be displayed simultaneously, is specified from the keyboard 5. In this embodiment, as illustrated in FIG. 2, it is specified that the 12 CT images are displayed by being arrayed in a display form of 3×4 frames.

Figure 2:
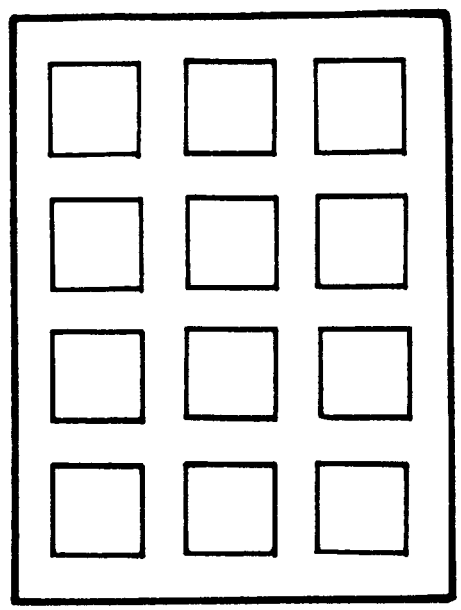
FIG. 2 is an explanatory view showing an example of a 3×4 display form.

Thereafter, in accordance with the 12 image signals $S_{C1}$ through $S_{C12}$ stored in the image storing memory 4, the CPU 6 forms the display image signal $S_H$, which is composed of the image signals $S_{C1}$ through $S_{C12}$ and represents the images having the reduced image sizes and arrayed in the display form of 3×4 frames shown in FIG. 2. The display image signal $S_H$ having been formed is compressed by the compression means 7 and stored on the magnetic disk 8. Also, the 12 image signals $S_{C1}$ through $S_{C12}$, which have been read from the image signal output means 2, are compressed by the compression means 7 and stored on the magnetic disk 8.

In cases where a request for reproducing the visible images from the display image signal $S_H$ and displaying them is made, a command for displaying the images is given from the keyboard 5 to the CPU 6. In accordance with the command for displaying the images, the CPU 6 reads the display image signal $S_H$ from the magnetic disk 8 and feeds it into the image size enlarging and reducing means 9A. The image size enlarging and reducing means 9A carries out the image size enlargement or reduction processing on the display image signal $S_H$ in accordance with the size of the CRT display device 11. The display image signal $S_H$, which has been obtained from the image size enlargement or reduction processing, is fed into the image processing means 9B. The image processing means 9B carries out desired image processing, such as gradation processing or density modulation processing, on the display image signal $S_H$, which has been obtained from the image size enlargement or reduction processing.

The display image signal $S_H$, which has been obtained from the image processing, is temporarily stored in the image display frame memory 10 and is then used for the reproduction of the visible images on the CRT display device 11.

In the manner described above, at the time at which the plurality of the image signals $S_{C1}$ through $S_{C12}$ are read from the image signal output means 2, the display image signal $S_H$, which is composed of the image signals $S_{C1}$ through $S_{C12}$ and represents the images arrayed in the desired display form, is formed and stored on the magnetic disk 8. Therefore, when the images are to be displayed in the desired display form, the time required to display the images can be kept markedly shorter than with the conventional image displaying method, in which a plurality of image signals are read one after another in units of a single image signal representing a single image from the magnetic disk 8, and in which a desired display form is then formed and the images are displayed in the desired display form on the CRT display device 11. For example, in cases where 12 images are displayed by being arrayed in a display form of 3×4 frames as in this embodiment, the time required to display the images can be kept as short as $\frac{1}{12}$ of the time required in the conventional image displaying method, in which a plurality of image signals are read one after another in units of a single image signal representing a single image from the magnetic disk 8, and in which the images are then reproduced one after another on the CRT display device 11.

Figure 3:
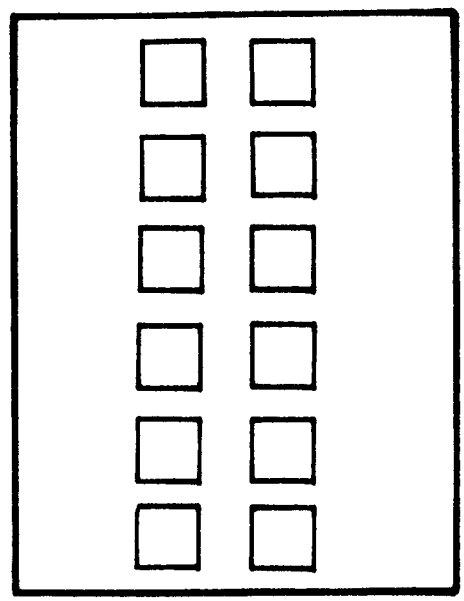
FIG. 3 is an explanatory view showing an example of a 2×6 display form.

It often occurs that the desired display form is to be altered to a different display form and a plurality of images are to be displayed in the different display form. This embodiment of the image displaying apparatus in accordance with the present invention can easily cope with such cases. Specifically, in cases where the desired display form is to be altered, e.g. in cases where the display form of 3×4 frames is to be altered to a display form of 2×6 frames shown in FIG. 3, a command for altering the display form is given from the keyboard 5 to the CPU 6. In accordance with the command for altering the display form, the CPU 6 reads the plurality of the image signals $S_{C1}$ through $S_{C12}$ from the magnetic disk 8 and stores them in the image storing memory 4. In the image storing memory 4, in accordance with the plurality of the image signals $S_{C1}$ through $S_{C12}$ a different display image signal $S_H'$ is formed, which is composed of the image signals $S_{C1}$ through $S_{C12}$ and represents the images having the reduced image sizes and arrayed in the display form of 2×6 frames shown in FIG. 3. The different display image signal $S_H'$ having been formed is compressed by the compression means 7 and stored on the magnetic disk 8. Also, the 12 image signals $S_{C1}$ through $S_{C12}$, which have been read from the image signal output means 2, are compressed by the compression means 7 and stored again on the magnetic disk 8.

In cases where a request for reproducing the visible images from the different display image signal $S_H'$ and displaying them is made, a command for displaying the images is given from the keyboard 5 to the CPU 6. In accordance with the command for displaying the images, the CPU 6 reads the different display image signal $S_H'$ from the magnetic disk 8 and feeds it into the image size enlarging and reducing means 9A. In the same manner as that for the display image signal $S_H$, the image size enlargement or reduction processing and the image processing, such as gradation processing or density modulation processing, are carried out on the different display image signal $S_H'$.

The different display image signal $S_H'$, which has been obtained from the image processing, is temporarily stored in the image display frame memory 10 and is then used for the reproduction of the visible images on the CRT display device 11.

The visible images thus displayed take on the display form of 2×6 frames. In this manner, the image signals $S_{C1}$ through $S_{C12}$, which have been read from the image signal output means 2, are also stored on the magnetic disk 8. Therefore, in cases where the desired display form is to be altered to the different display form and the images are to be displayed in the different display form, the plurality of the image signals $S_{C1}$ through $S_{C12}$ can be read from the magnetic disk 8, and the different display image signal $S_H'$ can thereby be formed, which is composed of the image signals $S_{C1}$ through $S_{C12}$ and represents the images arrayed in the different display form. Accordingly, the operation for reading out the image signals $S_{C1}$ through $S_{C12}$ from the image signal output means 2 need not be carried out again, and the images in the different display form can be reproduced and displayed easily.

In the embodiment described above, the single magnetic disk 8 is utilized in order to store the display image signal $S_H$ and the plurality of the image signals $S_{C1}$ through $S_{C12}$. Alternatively, a magnetic disk (not shown), which is other than the magnetic disk 8, may be provided in order to store the plurality of the image signals $S_{C1}$ through $S_{C12}$. In this manner, the display image signal $S_H$ may be stored on the magnetic disk 8, and the plurality of the image signals $S_{C1}$ through $S_{C12}$ may be stored on the other magnetic disk.

What is claimed is:

1. An image displaying method for displaying multiple medical images of the same patient, comprising the steps of:

i) reading a plurality of single image signals, each of which represents a desired single medical image from among a plurality of single medical images of the same patient, from an image signal output means which outputs the plurality of the desired single image signals in units of a single image signal representing a single image, ii) inputting a desired display form for viewing, and for simultaneously displaying said plurality of single medical images of the same patient, iii) forming a display image signal in accordance with said desired display form for viewing, in which visible images reproduced from the plurality of the single image signals having been read from said single image signal output means are to be displayed simultaneously, said display image signal being composed of the plurality of the single image signals and representing the plurality of the single images arrayed in said desired display form for viewing, iv) storing said display image signal on a non-volatile storage means as a composite image in the same format as said desired display form for viewing so that said stored composite image contains said plurality of medical images pre-arranged in said desired display form for viewing, and v) when a request for displaying the images represented by said display image signal is made, reading said display image signal from said non-volatile storage means, reproducing the visible single images from said display image signal, and displaying the visible single images.

2. A method as defined in claim 1 wherein the plurality of the image signals having been read from said single image signal output means are also stored on said storage means, and when a request for displaying the images, which are represented by the plurality of the single image signals, in a different display form is made, the plurality of the image signals are read from said storage means, a different display image signal is formed in accordance with said different display form and stored in said storage means, said different display image signal being composed of the plurality of the image signals and representing the plurality of the images arrayed in said different display form, and visible images from said different display image signal.

3. A method as defined in claim 1 wherein the plurality of the image signals having been read from said image signal output means are also stored on another storage means, which is other than said storage means, and when a request for displaying the images, which are represented by the plurality of the image signals, in a different display form is made, the plurality of the image signals are read from said another storage means, a different display image signal is formed in accordance with said different display form, said different display image signal being composed of the plurality of the image signals and representing the plurality of the images arrayed in said different display form, and visible images are reproduced from said different display image signal and displayed.

4. A method as defined in claim 1, further comprising the step of:

compressing said display image signal before storing said display image signal on said non-volatile storage means.

5. A method as defined in claim 1, wherein said image signal output means includes a CT scanner.

6. An image displaying apparatus for displaying multiple medical images of the same patient, comprising:

i) a reading means for reading a plurality of single image signals, each of which represents a desired single medical image from among a plurality of single medical images of the same patient, from an image signal output means which outputs the plurality of the single image signals in units of a single image signal representing a single image, ii) a setting means for setting a desired display form for viewing, in which visible images reproduced from the plurality of the single image signals having been read from said image signal output means are to be displayed simultaneously, iii) a display image signal forming means for forming a display image signal in accordance with said set display form, said display image signal being composed of the plurality of the single image signals and representing the plurality of the single images arrayed in said set display form, iv) a non-volatile storage means for storing said display image signal as a composite image in the same format as said desired display form for viewing so that said stored composite image contains said plurality of medical images pre-arranged in said desired display form for viewing, v) a display requesting means for making a request for displaying the images represented by said display image signal, and vi) a display means which, when a request for displaying the images represented by said display image signal is made from said display requesting means, reads said display image signal from said storage means, reproduces the visible images from said display image signal, and displays the visible images.

7. An apparatus as defined in claim 6 wherein said storage mans also stores the plurality of the image signals having been read from said image signal output means, and when a request for displaying the images, which are represented by the plurality of the image signals, in a different display form is made, said display image signal forming means reads the plurality of the image signals from said storage means and forms a different display image signal in accordance with said different display form, said different display image signal being composed of the plurality of the image signals and representing the plurality of the images arrayed in said different display form, and said display means reproduces visible images from said different display image signal and displays the visible images.

8. An apparatus as defined in claim 6 wherein the apparatus further comprises another storage means, which stores the plurality of the image signals having been read from said image signal output means, and when a request for displaying the images, which are represented by the plurality of the image signals, in a different display form is made, said display image signal forming means reads the plurality of the image signals from said another storage means and forms a different display image signal in accordance with said different display form, said different display image signal being composed of the plurality of the image signals and representing the plurality of the images arrayed in said different display form, and said display means reproduces visible images from said different display image signal and displays the visible images.

9. An apparatus as defined in claim 6, further comprising:

compression means for compressing said display image signal before said storage means stores said display image signal.

10. An apparatus as defined in claim 6, wherein said image signal output means includes a CT scanner.

* * * * *